(12) United States Patent
Yang et al.

(10) Patent No.: US 11,942,834 B2
(45) Date of Patent: Mar. 26, 2024

(54) MOTOR DRIVE SYSTEM AND MOTOR DRIVE METHOD

(71) Applicant: ZENG HSING INDUSTRIAL CO., LTD., Taichung (TW)

(72) Inventors: Chin-Shu Yang, Taichung (TW); Chih-Huang Wu, Taichung (TW)

(73) Assignee: ZENG HSING INDUSTRIAL CO., LTD., Taichung (TW)

( * ) Notice: Subject to any disclaimer, the term of this patent is extended or adjusted under 35 U.S.C. 154(b) by 262 days.

(21) Appl. No.: 17/688,112

(22) Filed: Mar. 7, 2022

(65) Prior Publication Data

US 2023/0099313 A1 Mar. 30, 2023

(30) Foreign Application Priority Data

Sep. 24, 2021 (TW) .................. 110135612

(51) Int. Cl.
| | |
|---|---|
| *H02K 11/33* | (2016.01) |
| *D05B 69/12* | (2006.01) |
| *D05B 69/30* | (2006.01) |
| *H02K 7/14* | (2006.01) |
| *H02K 11/04* | (2016.01) |

(52) U.S. Cl.
CPC ............. *H02K 11/33* (2016.01); *D05B 69/12* (2013.01); *D05B 69/30* (2013.01); *H02K 7/14* (2013.01); *H02K 11/04* (2013.01)

(58) Field of Classification Search
CPC .......... H02K 11/04; H02K 11/33; H02K 7/14; D05B 9/12; D05B 9/30

USPC .................................................. 310/68 D, 71
See application file for complete search history.

(56) References Cited

U.S. PATENT DOCUMENTS

| | | | | |
|---|---|---|---|---|
| 8,378,608 | B2* | 2/2013 | Robertson | H02M 5/4505 318/729 |
| 10,158,299 | B1* | 12/2018 | Wei | H02M 1/12 |
| 10,637,346 | B2* | 4/2020 | Burguete Archel | H02M 1/32 |
| 11,211,879 | B2* | 12/2021 | Abuelnaga | H02M 1/14 |
| 11,336,206 | B2* | 5/2022 | Cui | H02M 7/53876 |
| 2013/0314426 | A1* | 11/2013 | Wu | G06T 1/60 345/520 |
| 2014/0325285 | A1* | 10/2014 | Wu | G06F 11/0745 714/43 |
| 2014/0344565 | A1* | 11/2014 | Wu | G06F 9/44505 713/100 |
| 2014/0380080 | A1* | 12/2014 | Wu | G06F 1/3296 713/340 |
| 2015/0026519 | A1* | 1/2015 | Wu | G06F 11/263 714/30 |

(Continued)

*Primary Examiner* — Rashad H Johnson
(74) *Attorney, Agent, or Firm* — Birch, Stewart, Kolasch & Birch, LLP (57) ABSTRACT

A motor drive system includes a rectifier circuit, a controller, a modulator circuit and a direct current (DC) motor. The rectifier circuit is configured to convert an alternating current (AC) voltage to a DC voltage. The controller is configured to output a control signal. The modulator circuit includes a pulse generation module, a feedback determination module, a pulse modulation module and a driving module, and is configured to generate a modulated DC driving signal based on the DC voltage and the control signal generated by the rectifier circuit and the controller. The DC motor is configured to operate in accordance with the modulated DC driving signal generated by the modulator circuit.

17 Claims, 3 Drawing Sheets

(56) References Cited

U.S. PATENT DOCUMENTS

| | | | |
|---|---|---|---|
| 2016/0013715 A1* | 1/2016 | Patel | H02M 1/126 363/44 |
| 2023/0099313 A1* | 3/2023 | Yang | H02K 7/14 310/68 D |

* cited by examiner

MOTOR DRIVE SYSTEM AND MOTOR DRIVE METHOD

CROSS-REFERENCE TO RELATED APPLICATION

This application claims priority of Taiwanese Invention Patent Application No. 110135612, filed on Sep. 24, 2021.

FIELD

The disclosure relates to a drive system, and more particularly to a motor drive system including a direct current (DC) motor and a motor drive method to be performed by the motor drive system.

BACKGROUND

A conventional motor drive system for a mechanical sewing machine employs an alternating current (AC) motor to drive the sewing machine. The conventional motor drive system includes a foot pedal control for a user to control the rotational speed of the AC motor by controlling a pedal travel distance of the foot pedal control, and thereby control the stitching speed of the sewing machine. The conventional motor drive system includes a driving circuit that is electrically connected to the mains electricity and that is electrically connected between the AC motor and the foot pedal control, so that the driving circuit generates a driving signal based on the pedal travel distance, and delivers the driving signal to the AC motor to drive the AC motor to operate at a rotational speed in accordance with the pedal travel distance. A drawback of the conventional motor drive system of the mechanical sewing machine employing the AC motor is that it requires a complex circuit for modulating the rotational speed of the AC motor.

SUMMARY

Therefore, an object of the disclosure is to provide a motor drive system and a motor driving method that can alleviate the drawback of the prior art.

According to one aspect of the disclosure, the motor drive system is adapted to receiving an alternating current (AC) voltage and driving a sewing machine to sew with a needle of the sewing machine. The motor drive system includes a rectifier circuit, a controller, a modulator circuit and a DC motor. The rectifier circuit is configured to receive the AC voltage, convert the AC voltage thus received to a direct current (DC) voltage that is higher than one hundred volts, and output the DC voltage. The controller is configured to output a control signal. The modulator circuit is electrically connected to the rectifier circuit and the controller to receive the DC voltage and the control signal, and is configured to generate a modulated DC driving signal based on the DC voltage and the control signal, and output the modulated DC driving signal. The DC motor is electrically connected to the modulator circuit to receive the modulated DC driving signal, and is configured to operate at a rotational speed corresponding to the modulated DC driving signal in order to drive the needle of the sewing machine to move correspondingly. The modulator circuit includes a pulse generation module, a feedback determination module, a pulse modulation module and a driving module. The pulse generation module is electrically connected to the controller to receive the control signal from the controller, and is configured to generate an original pulse signal based on the control signal, and output the original pulse signal. The feedback determination module is configured to receive a feedback signal, generate a feedback determination signal based on the feedback signal, which is related to an average voltage of the feedback signal, and output the feedback determination signal. The pulse modulation module is electrically connected to the pulse generation module to receive the original pulse signal, electrically connected to the feedback determination module to receive the feedback determination signal, and is configured to generate a modulated pulse signal having a modulated duty cycle based on the original pulse signal and the feedback determination signal, and to output the modulated pulse signal, wherein the modulated duty cycle has a positive correlation with the average voltage of the feedback signal. The driving module includes a positive output terminal and a negative output terminal electrically connected to the DC motor. The driving module is electrically connected to the feedback determination module, and is further electrically connected to the rectifier circuit and the pulse modulation module to receive the DC voltage and the modulated pulse signal. The driving module is configured to modulate the DC voltage based on the modulated pulse signal to generate the modulated DC driving signal, is configured to generate the feedback signal, the average voltage of which has a negative correlation with an average voltage of the modulated DC driving signal, and is configured to output the modulated DC driving signal via the positive output terminal and the negative output terminal to the DC motor, and the feedback signal to the feedback determination module.

According to one aspect of the disclosure, the motor drive method is to be performed by a modulator circuit which is electrically connected to a rectifier circuit to receive a DC voltage, and which is electrically connected to a direct current (DC) motor via a positive output terminal and a negative output terminal. The modulator circuit includes a pulse generation module, a feedback determination module, a pulse modulation module and a driving module that includes a field-effect transistor (FET). The motor drive method includes steps of: A) by the driving module, generating a feedback signal based on a source current of the FET, and outputting the feedback signal to the feedback determination module; B) by the feedback determination module, generating a feedback determination signal based on the feedback signal received from the driving module, and outputting the feedback determination signal to the pulse modulation module; C) by the pulse modulation module, receiving an original pulse signal from the pulse generation module, generating a modulated pulse signal having a modulated duty cycle based on the original pulse signal and based on the feedback determination signal received from the feedback determination module, and outputting the modulated pulse signal to the driving module; and D) by the driving module, modulating the DC voltage based on the modulated pulse signal to generate a modulated DC driving signal an average voltage of which has a positive correlation with the modulated duty cycle, and outputting the modulated DC driving signal via the positive output terminal and the negative output terminal to the DC motor, in order to drive the DC motor to operate at a rotational speed corresponding to the modulated DC driving signal.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
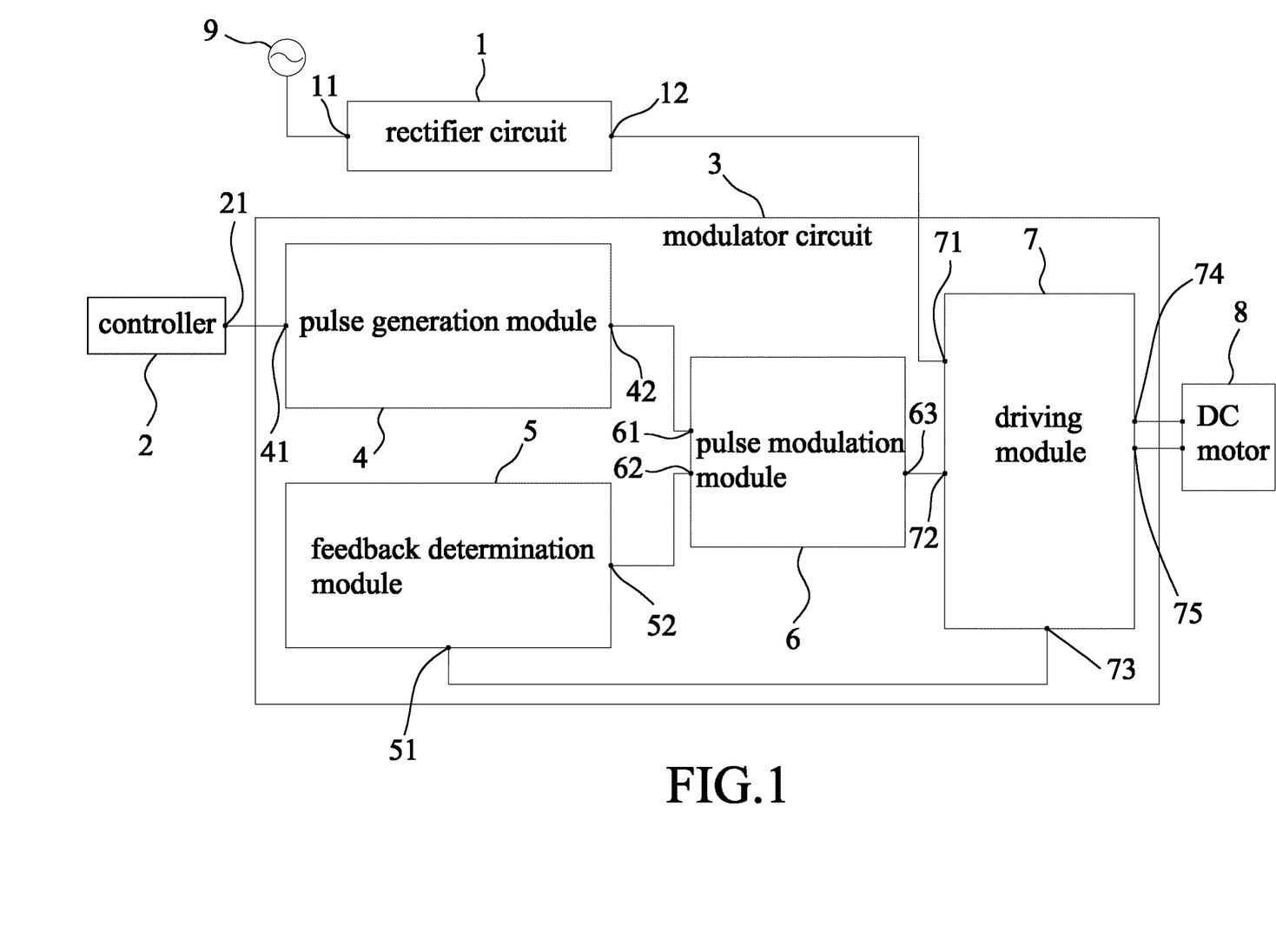
FIG. 1 is a schematic diagram that exemplarily illustrates a motor drive system according to an embodiment of the disclosure.

FIG. 1 exemplarily illustrates a motor drive system according to an embodiment of the disclosure. The motor drive system is adapted to receive an alternating current (AC) voltage from an AC power source 9 and drive a sewing machine (not shown) to sew with a needle (moving in an up-and-down direction) of the sewing machine. According to some embodiments, the AC power source 9 may be the mains electricity, which may provide the AC voltage that is between 100 volts and 120 volts in the American standard, or the AC voltage that is between 220 volts and 240 volts in the European standard.

As illustrated in FIG. 1, the motor drive system includes a rectifier circuit 1, a controller 2, a modulator circuit 3 and a direct current (DC) motor 8.

The rectifier circuit 1 includes an input terminal 11 and an output terminal 12. The input terminal 11 is electrically connected to the AC power source 9 to receive the AC voltage. The rectifier circuit 1 is configured to convert the AC voltage received at the input terminal 11 to a DC voltage that higher than 100 volts, and output the DC voltage from the output terminal 12. According to some embodiments, when the AC voltage provided by the AC power source 9 is between 100 volts and 120 volts (i.e., compliant with the American standard), the rectifier circuit 1 is configured to generate the DC voltage to be between 100 volts and 120 volts; when the AC voltage provided by the AC power source 9 is between 220 volts and 240 volts (i.e., compliant with the European standard), the rectifier circuit 1 is configured to generate the DC voltage to be between 220 volts and 240 volts. According to some embodiments, the rectifier circuit 1 may include a bridge rectifier circuit, a filter circuit and a voltage stabilizer circuit to perform a full-wave rectification for generating the DC voltage.

The controller 2 includes an output terminal 21, and is configured to generate a control signal and output the control signal at the output terminal 21. According to some embodiments, the controller 2 may be a foot pedal control that is configured to receive a DC power and adjust its internal resistance to correspond with a force that a user applies on the controller 2 with his/or foot, thereby generating the control signal that is a voltage signal, and that has a magnitude corresponding to the force applied on the controller 2. In an embodiment, the DC power that the controller 2 receives may be from the output terminal 12 of the rectifier circuit 1, but the disclosure is not limited thereto.

The modulator circuit 3 includes a voltage input terminal 71, a control input terminal 41, a positive output terminal 74 and a negative output terminal 75. The voltage input terminal 71 is electrically connected to the rectifier circuit 1 to receive the DC voltage. The control input terminal 41 is electrically connected to the controller 2 to receive the control signal. The modulator circuit 3 is configured to generate a modulated DC driving signal based on the DC voltage and the control signal, and output the modulated DC driving signal at the positive output terminal 74 and the negative output terminal 75, wherein the modulated DC driving signal is a pulse-width-modulated signal and has an average voltage that is higher than 90 volts. Details of the modulator circuit 3 will be described later.

The DC motor 8 is electrically connected to the positive output terminal 74 and the negative output terminal 75 of the modulator circuit 3 to receive the modulated DC driving signal, and is configured to operate at a rotational speed corresponding to the modulated DC driving signal in order to drive the needle of the sewing machine to move correspondingly.

As illustrated in FIG. 1, the modulator circuit 3 includes a pulse generation module 4, a feedback determination module 5, a pulse modulation module 6 and a driving module 7.

The pulse generation module 4 includes the control input terminal 41 and an original pulse output terminal 42. The control input terminal 41 is electrically connected to the output terminal 21 of the controller 2 to receive the control signal. The pulse generation module 4 is configured to generate an original pulse signal based on the control signal, and output the original pulse signal at the original pulse output terminal 42. The original pulse signal has an original duty cycle that corresponds to a voltage level of the control signal. According to some embodiments, the pulse generation module 4 may include a voltage-controlled oscillator (VCO) for generating the original pulse signal based on the voltage level of the control signal. In a particular embodiment, the original duty cycle is at least 30%, but the disclosure is not limited thereto.

The feedback determination module 5 includes a feedback input terminal 51 and a feedback determination output terminal 52. The feedback determination module 5 is configured to receive a feedback signal via the feedback input terminal 51, generate a feedback determination signal based on the feedback signal, which is related to an average voltage of the feedback signal, and output the feedback determination signal via the feedback determination output terminal 52.

Specifically, the feedback determination module 5 is configured to generate the feedback determination signal by selecting one of a first feedback determination signal, a second feedback determination signal, a third feedback determination signal and a fourth feedback determination signal to serve as the feedback determination signal by comparing the average voltage of the feedback signal received at the feedback input terminal 51 with a first feedback voltage level, a second feedback voltage level and a third feedback voltage level. The third feedback voltage level is higher than the second feedback voltage level, and the second feedback voltage level is higher than the first feedback voltage level. When the average voltage of the feedback signal is lower than the second feedback voltage level and is not lower than the first feedback voltage level, the first feedback determination signal is selected. When the average voltage of the feedback signal is lower than the third feedback voltage level and is not lower than the second feedback voltage level, the second feedback determination signal is selected. When the average voltage of the feedback signal is not lower than the third feedback voltage level, the third feedback determination signal is selected. When the average voltage of the feedback signal is lower than the first feedback voltage level, the fourth feedback determination signal is selected. According to some embodiments, the first, second and third feedback voltage levels may be predetermined based on a potential range of the average voltage of the feedback signal, and the first, second and third feedback determination signals are each a voltage signal having a voltage level different from the other two feedback determination signals. The feedback determination module 5 may be implemented by a comparator.

In an embodiment where the AC power source 9 provides an AC voltage that is between 100 volts and 120 volts (i.e., compliant with the American standard) and where the DC voltage that the rectifier circuit 1 generates is between 100 volts and 120 volts, the potential range of the average voltage of the feedback signal is from 0.2 volts to 4 volts, the first feedback voltage level is between 0.2 volts and 0.35 volts (e.g., 0.25 volts), the second feedback voltage level is between 0.7 volts and 1.0 volts (e.g., 0.75 volts), and the third feedback voltage level is between 1.2 volts and 1.5 volts (e.g., 1.25 volts). In an embodiment where the AC power source 9 provides an AC voltage that is between 220 volts and 240 volts (i.e., compliant with the European standard) and where the DC voltage that the rectifier circuit 1 generates is between 220 volts and 240 volts, the potential range of the average voltage of the feedback signal is from 0.5 volts to 4 volts, the first feedback voltage level is between 1.4 volts and 1.6 volts (e.g., 1.49 volts), the second feedback voltage level is between 1.7 volts and 1.85 volts (e.g., 1.74 volts), and the third feedback voltage level is between 1.9 volts and 2.1 volts (e.g., 1.98 volts).

The pulse modulation module 6 includes an original pulse input terminal 61, a feedback determination input terminal 62 and a modulated pulse output terminal 63. The original pulse input terminal 61 is electrically connected to the original pulse output terminal 42 of the pulse generation module 4 to receive the original pulse signal. The feedback determination input terminal 62 is electrically connected to the feedback determination output terminal 52 of the feedback determination module 5 to receive the feedback determination signal. The pulse modulation module 6 is configured to generate a modulated pulse signal having a modulated duty cycle based on the original pulse signal and the feedback determination signal, and to output the modulated pulse signal from the modulated pulse output terminal 63. In some embodiments, the modulated pulse signal has an amplitude and a frequency that are the same as the original pulse signal, but the modulated duty cycle of the modulated pulse signal is modulated depending on the feedback determination signal and may be different from the original duty cycle of the original pulse signal. According to some embodiments, the pulse modulation module 6 may be a pause width modulation circuit (i.e., a PWM circuit), or a PWM controller.

The feedback determination signal that the pulse modulation module 6 receives from the feedback determination module 5 is one of the first feedback determination signal, the second feedback determination signal, the third feedback determination signal and the fourth feedback determination signal that have the different voltage levels. The pulse modulation module 6 is configured to generate the modulated pulse signal that has the modulated duty cycle equal to a first duty cycle when receiving the first feedback determination signal from the feedback determination module 5, to generate the modulated pulse signal that has the modulated duty cycle equal to a second duty cycle when receiving the second feedback determination signal, to generate the modulated pulse signal that has the modulated duty cycle equal to a third duty cycle when receiving the third feedback determination signal, and to generate the modulated pulse signal that has the modulated duty cycle equal to the original duty cycle when receiving the fourth feedback determination signal (i.e., the modulated pulse signal and the original pulse signal are the same). The third duty cycle is higher than the second duty cycle, and the second duty cycle is higher than the first duty cycle. In this way, the modulated duty cycle of the modulated pulse signal has a positive correlation with the average voltage of the feedback signal. According to some embodiments, the first duty cycle may be between 35% and 40%, the second duty cycle may be between 50% and 60%, and the third duty cycle may be between 65% and 75%.

According to certain embodiments, the first, second and third duty cycles are not fixed values, and may each have a positive correlation with the original duty cycle of the original pulse signal as long as the third duty cycle is higher than the second duty cycle, and the second duty cycle is higher than the first duty cycle.

The driving module 7 includes the voltage input terminal 71, a modulated pulse input terminal 72, a feedback output terminal 73, the positive output terminal 74 and the negative output terminal 75. The voltage input terminal 71 is electrically connected to the output terminal 12 of the rectifier circuit 1 to receive the DC voltage. The modulated pulse input terminal 72 is electrically connected to the modulated pulse output terminal 63 of the modulation module 6 to receive the modulated pulse signal. The feedback output terminal 73 is electrically connected to the feedback input terminal 51 of the feedback determination module 5. The driving module 7 is configured to modulate the DC voltage based on the modulated pulse signal to generate the modulated DC driving signal, and output the modulated DC driving signal to the DC motor 8 via the positive output terminal 74 and the negative output terminal 75. The driving module 7 is also configured to generate the feedback signal, and output the feedback signal to the feedback determination module 5 via the feedback output terminal 73.

Figure 2:
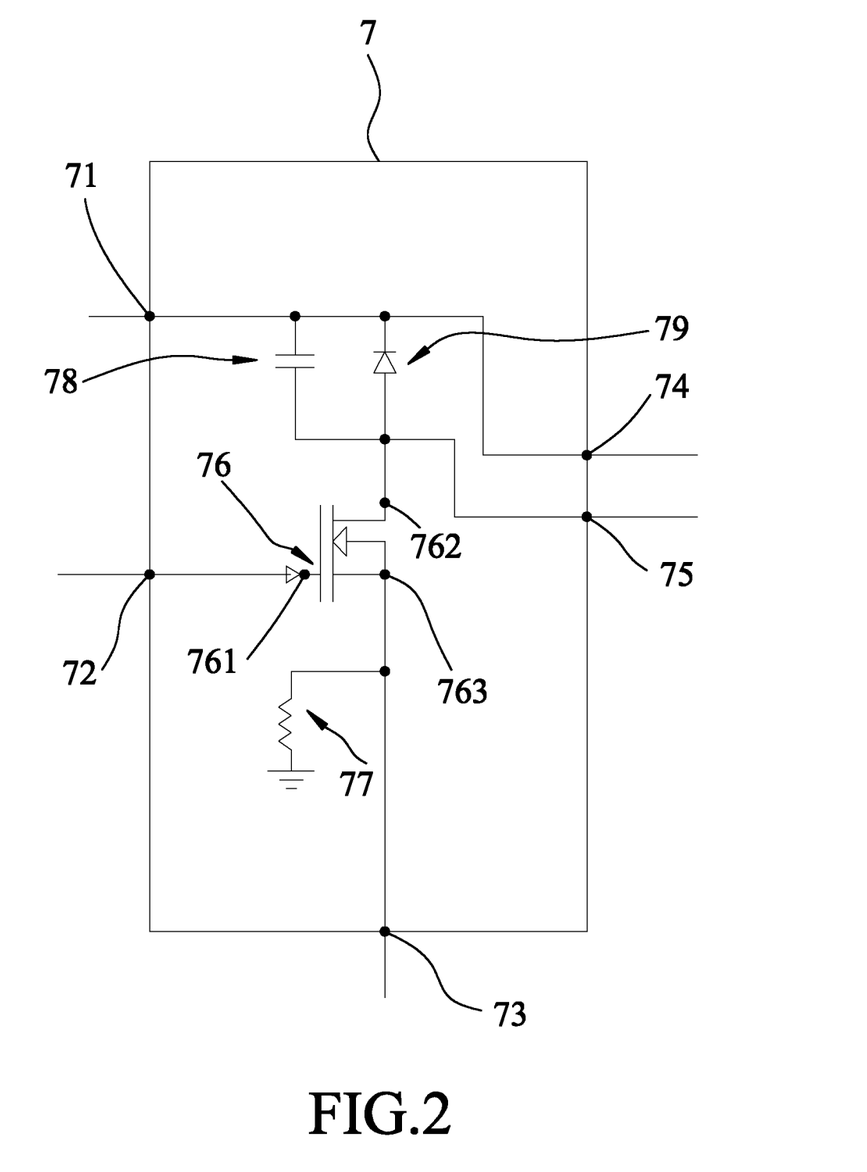
FIG. 2 exemplarily illustrates a circuit diagram of a driving module according to an embodiment of the disclosure.

FIG. 2 exemplarily illustrates a circuit diagram of the driving module 7 according to an embodiment of the disclosure. Referring to FIG. 2, the driving module 7 includes a switch 76, a feedback resistor 77, a capacitor 78 and a diode 79.

The switch 76 has a control terminal 761, a first terminal 762 and a second terminal 763. The control terminal 761 is electrically connected to the modulated pulse input terminal 72 and further connected to the modulated pulse output terminal 63 of the modulation module 6, in order to receive the modulated pulse signal. The first terminal 762 is electrically connected to the negative output terminal 75. The second terminal 763 is electrically connected to a terminal of the feedback resistor 77 and is also electrically connected to the feedback output terminal 73. According to some embodiments, the switch 76 may be a field-effect transistor (FET) 76, the control terminal 761 may be a gate terminal, the first terminal 762 may be a drain terminal, and the second terminal 763 may be a source terminal.

Aside from the terminal electrically connected to the second terminal 763 of the switch 76, the feedback resistor 77 includes another terminal that is grounded. Both of the capacitor 78 and the diode 79 are electrically connected between the first terminal 762 of the switch 76 and the voltage input terminal 71 (equivalent to the positive output terminal 74), wherein the anode of the diode 79 is connected to the first terminal 762, and the cathode of the diode 79 is connected to the voltage input terminal 71 and the positive output terminal 74. In an embodiment, the feedback resistor 77 has a resistance of 0.1 ohm (Ω), and the capacitor 78 has a capacitance of 0.01 microfarad (mF), but the disclosure is not limited thereto.

The switch 76 is controlled by the modulated pulse signal at the control terminal 761 to transition between an ON state, where the first terminal 762 is electrically connected to the second terminal 763, and an OFF state, where the first terminal 762 is electrically disconnected from the second terminal 763. Specifically, when the switch 76 receives at the control terminal 761 the modulated pulse signal that is at a high level, the switch 76 is in the ON state; when the switch 76 receives at the control terminal 761 the modulated pulse signal that is at a low level, the switch 76 is in the OFF state. In the ON state, a drain current appears and flows through the feedback resistor 77, resulting in a voltage on the second terminal 763 and the first terminal 762 (and also on the negative output terminal 75) to be substantially equal to the resistance of the feedback resistor 77 multiplied by the magnitude of the drain current (referred to as "feedback resistor voltage" hereinafter). In the OFF state, the voltage on the second terminal 763 is substantially equal to zero, the diode 79 is conductive, and the voltage on the first terminal 762 and the negative output terminal 75 is equal to the voltage on the positive output terminal 74, which is the DC voltage generated by the rectifier circuit 1 and which is received by the driving module 7 at the voltage input terminal 71. In this way, a first pulsed voltage that is anti-phase with the modulated pulse signal is formed at the first terminal 762 and the negative output terminal 75, wherein the higher value of the first pulsed voltage equals the DC voltage, and the lower value of the first pulsed voltage equals the feedback resistor voltage. Further, a second pulsed voltage that has a duty cycle the same as the modulated duty cycle of the modulated pulse signal is formed at the second terminal 763, wherein the higher value of the second pulsed voltage equals the feedback resistor voltage, and the lower value of the second pulsed voltage substantially equals zero. The second pulsed voltage serves as the feedback signal that the driving module 7 outputs to the feedback determination module 5 via the feedback output terminal 73.

The modulated DC driving signal to be outputted to the DC motor 8 via the positive output terminal 74 and the negative output terminal 75 is defined by a first output voltage at the positive output terminal 74 and a second output voltage at the negative output terminal 75. The first output voltage is the DC voltage generated by the rectifier circuit 1 and received by the driving module 7 at the voltage input terminal 71. The second output voltage is the first pulsed voltage that is formed at the first terminal 762 and that is anti-phase with the modulated pulse signal. Specifically, the modulated DC driving signal is a PWM signal that is a pulsed voltage signal which has an instantaneous amplitude equal to the first output voltage (which equals the DC voltage) subtracted by the second output voltage (which equals the feedback resistor voltage and the DC voltage when the switch 76 is in the ON state and the OFF state, respectively) at the instant time, and that can be regarded as an analogous (and varying) DC voltage defined by an average voltage of the pulsed voltage signal. When the DC motor 8 receives the modulated DC driving signal, which includes the first output voltage at the positive output terminal 74 and the second output voltage at the negative output terminal 75, the DC motor 8 operates at a rotational speed corresponding to the modulated DC driving signal (specifically, the average voltage of the modulated DC driving signal) and drives the needle of the sewing machine to move at a corresponding speed. According to some embodiments, the driving module 7 is configured to generate the feedback signal that has an average voltage falling in a range from 0.5 volts to 4 volts, and the modulated DC driving signal has an average voltage greater than 90 volts. It can be appreciated that the average voltage of the modulated DC driving signal has a positive correlation with the ratio of the modulated duty cycle. Therefore, the average voltage of the modulated DC driving signal may be adjusted by adjusting the modulated duty cycle of the modulated pulse signal generated by the pulse modulation module 6.

It can be seen from the previous description with respect to the driving module 7 that the feedback signal the driving module 7 outputs to the feedback determination module 5 corresponds to the modulated DC driving signal the driving module 7 outputs to the DC motor 8. Specifically, the average voltage of the feedback signal corresponds to the average voltage of the modulated DC driving signal. Further in view of the previous description with respect to the pulse modulation module 6, the modulated duty cycle of the modulated pulse signal generated by the pulse modulation module 6 has a positive correlation with the feedback signal (that is, a small feedback signal corresponds to a low modulated duty cycle, and a large feedback signal corresponds to a high modulated duty cycle), has a positive correlation with the modulated DC driving signal that is to be generated and outputted by the driving module 7 to the DC motor 8, and also has a positive correlation with the rotational speed at which the DC motor 8 operates. In this way, the DC motor 8 may quickly achieve a desired rotational speed, and stability of the rotational speed of the DC motor 8 is improved. Further, the motor drive system disclosed in FIG. 1 enables the DC voltage that is provided by the rectifier circuit 1 and that is converted directly from the AC voltage (which may be the mains electricity) from the AC power source 9 to be utilized to control the DC motor 8 without going through a step-down transformation, thereby reducing transmission loss of electric power.

Figure 3:
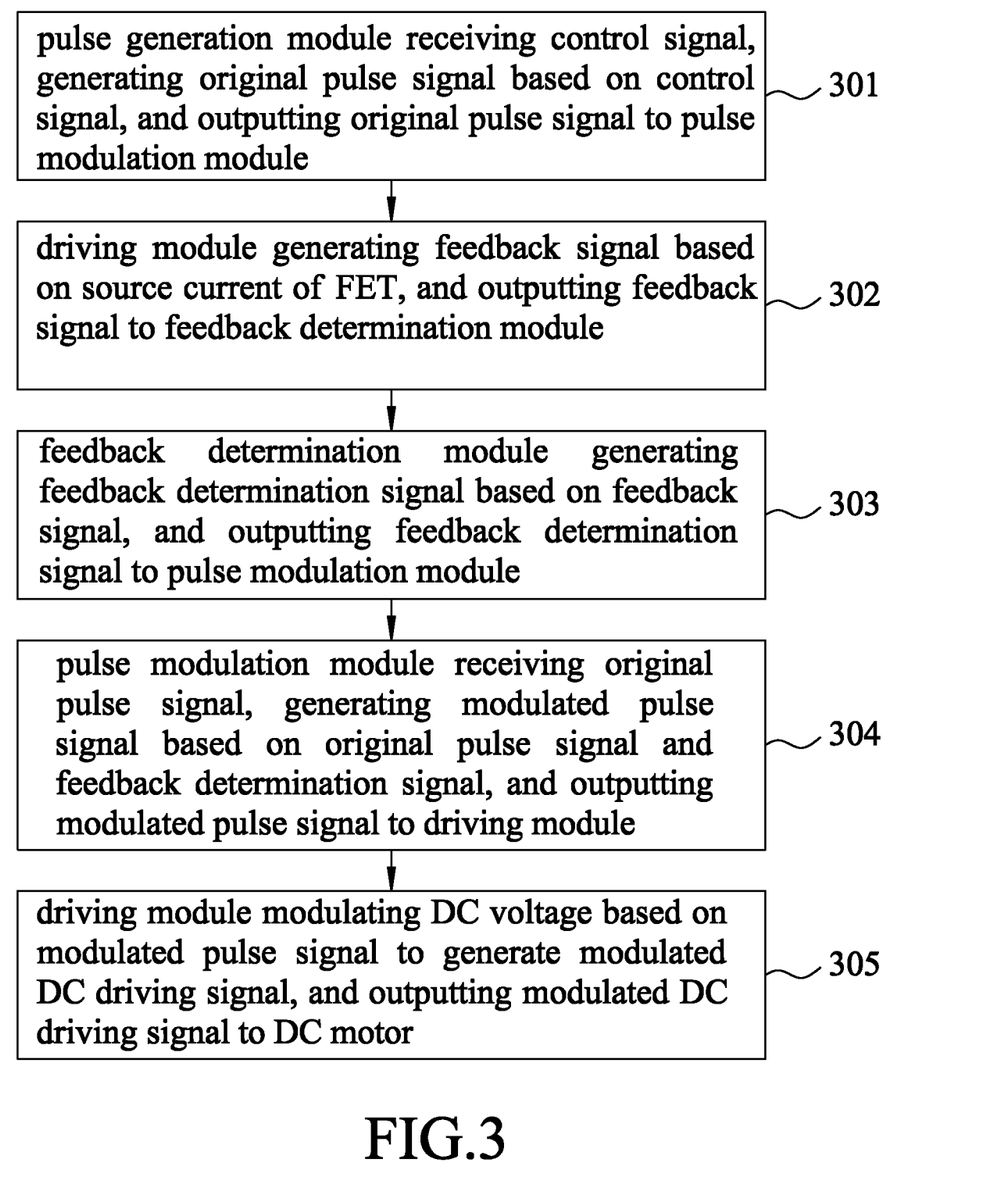
FIG. 3 is a flow chart that exemplarily illustrates a motor drive method according to an embodiment of the disclosure.

FIG. 3 exemplarily illustrates a motor drive method that is to be performed by the modulator circuit 3 of the motor drive system according to an embodiment of the disclosure. Referring to FIG. 3, the motor drive method includes Steps 301-305.

In Step 301, the pulse generation module 4 of the modulator circuit 3 receives the control signal from the controller 2 that is electrically connected to the modulator circuit 3, generates the original pulse signal that has the original duty cycle based on the control signal, and outputs the original pulse signal to the pulse modulation module 6.

In Step 302, the driving module 7 of the modulator circuit 3 generates a feedback signal based on a source current of the switch 76, and outputs the feedback signal to the feedback determination module 5. The source current of the switch 76 equals the drain current of the FET when the switch 76 is in the ON state, and has a magnitude of zero when the switch 76 is in the OFF state. It should be noted that Step 302 is not necessarily performed after Step 301. Step 302 may be performed simultaneously with Step 301.

In Step 303, the feedback determination module 5 of the modulator circuit 3 generates the feedback determination signal based on the feedback signal received from the driving module 7, and outputs the feedback determination signal to the pulse modulation module 6. Specifically, the feedback determination signal is generated by selecting one of the first feedback determination signal, the second feedback determination signal and the third feedback determination signal that have been described above to serve as the feedback determination signal, by comparing the average voltage of the feedback signal with the first feedback voltage level, the second feedback voltage level and the third feedback voltage level. The first feedback determination signal is selected when the average voltage of the feedback signal is lower than the second feedback voltage level and is not lower than the first feedback voltage level, the second feedback determination signal is selected when the average voltage of the feedback signal is lower than the third feedback voltage level and is not lower than the second feedback voltage level, and the third feedback determination signal is selected when the average voltage of the feedback signal is not lower than the third feedback voltage level.

In Step 304, the pulse modulation module 6 of the modulator circuit 3 receives the original pulse signal having the original duty cycle from the pulse generation module 4, generates the modulated pulse signal having the modulated duty cycle based on the original pulse signal and based on the feedback determination signal received from the feedback determination module 5, and outputs the modulated pulse signal to the driving module 7. Specifically, the modulated pulse signal is generated to have the modulated duty cycle equal to one of the first, second and third duty cycles that have been described above when receiving the first, second and third feedback determination signals, respectively.

In Step 305, the driving module 7 of the modulator circuit 3 modulates the DC voltage (which may be between 100 volts and 120 volts or between 220 volts and 240 volts in different embodiments) received from the rectifier circuit 1 based on the modulated pulse signal to generate the modulated DC driving signal, the average voltage of which has a positive correlation with the modulated duty cycle, and outputs the modulated DC driving signal via the positive output terminal 74 and the negative output terminal 75 to the DC motor 8, in order to drive the DC motor 8 to operate at a rotational speed corresponding to the modulated DC driving signal. The modulating of the DC voltage in Step 305 includes controlling the switch 76 to transition between the ON state and the OFF state based on the modulated pulse signal, so that the pulsed voltage (i.e., the first pulsed voltage mentioned above) that has a duty cycle with opposite phase to the modulated duty cycle of the modulated pulse signal is formed at the first terminal 762 of the switch 76. As mentioned above, the modulated DC driving signal is a PWM signal which is defined by the first output voltage to be outputted from the positive output terminal 74 and the second output voltage to be outputted from the negative output terminal 75, wherein the second output voltage is generated based on the drain current of the switch 76.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A motor drive system adapted to receiving an alternating current (AC) voltage and driving a sewing machine to sew with a needle of the sewing machine, the motor drive system comprising:
    a rectifier circuit configured to receive the AC voltage, convert the AC voltage thus received to a direct current (DC) voltage that is higher than one hundred volts, and output the DC voltage;
    a controller configured to output a control signal;
    a modulator circuit electrically connected to said rectifier circuit and said controller to receive the DC voltage and the control signal, and configured to generate a modulated DC driving signal based on the DC voltage and the control signal, and output the modulated DC driving signal; and
    a DC motor electrically connected to said modulator circuit to receive the modulated DC driving signal, and configured to operate at a rotational speed corresponding to the modulated DC driving signal in order to drive the needle of the sewing machine to move correspondingly,
    wherein said modulator circuit includes a pulse generation module, a feedback determination module, a pulse modulation module and a driving module,
    wherein said pulse generation module is electrically connected to said controller to receive the control signal from said controller, and configured to generate an original pulse signal based on the control signal, and output the original pulse signal;
    wherein said feedback determination module is configured to receive a feedback signal, generate a feedback determination signal based on the feedback signal, which is related to an average voltage of the feedback signal, and output the feedback determination signal;
    wherein said pulse modulation module is electrically connected to said pulse generation module to receive the original pulse signal, electrically connected to said feedback determination module to receive the feedback determination signal, and configured to generate a modulated pulse signal having a modulated duty cycle based on the original pulse signal and the feedback determination signal, and to output the modulated pulse signal, the modulated duty cycle having a positive correlation with the average voltage of the feedback signal;
    wherein said driving module includes a positive output terminal and a negative output terminal electrically connected to said DC motor, is electrically connected to said feedback determination module, is further electrically connected to said rectifier circuit and said pulse modulation module to receive the DC voltage and the modulated pulse signal, and is configured to:
        modulate the DC voltage based on the modulated pulse signal to generate the modulated DC driving signal, generate the feedback signal the average voltage of which corresponds to an average voltage of the modulated DC driving signal, and output the modulated DC driving signal via said positive output terminal and said negative output terminal to said DC motor, and the feedback signal to said feedback determination module.

2. The motor drive system of claim 1, wherein said driving module further includes:

a feedback resistor that has two terminals one of which is grounded; and a switch that has a control terminal which is electrically connected to said pulse modulation module to receive the modulated pulse signal, a first terminal which is electrically connected to said negative output terminal, and a second terminal which is electrically connected to the other one of said terminals of said feedback resistor and which outputs the feedback signal;

wherein said switch is controlled by the modulated pulse signal to transition between an ON state where said first terminal is electrically connected to said second terminal and an OFF state where said first terminal is electrically disconnected from said second terminal, so that a pulsed voltage that has a duty cycle the same as the modulated duty cycle of the modulated pulse signal is formed at said first terminal and the average voltage of the modulated DC driving signal has a positive correlation with the ratio of the modulated duty cycle.

3. The motor drive system of claim 1, wherein:

said feedback determination module is configured to generate the feedback determination signal by selecting one of a first feedback determination signal, a second feedback determination signal and a third feedback determination signal to serve as the feedback determination signal by comparing the average voltage of the feedback signal with a first feedback voltage level, a second feedback voltage level higher than the first feedback voltage level and a third feedback voltage level higher than the second feedback voltage level, wherein the first feedback determination signal is selected when the average voltage of the feedback signal is lower than the second feedback voltage level and is not lower than the first feedback voltage level, the second feedback determination signal is selected when the average voltage of the feedback signal is lower than the third feedback voltage level and is not lower than the second feedback voltage level, and the third feedback determination signal is selected when the average voltage of the feedback signal is not lower than the third feedback voltage level; and said pulse modulation module is configured to generate the modulated pulse signal that has the modulated duty cycle equal to a first duty cycle when receiving the first feedback determination signal from said feedback determination module, to generate the modulated pulse signal that has the modulated duty cycle equal to a second duty cycle higher than the first duty cycle when receiving the second feedback determination signal, and to generate the modulated pulse signal that has the modulated duty cycle equal to a third duty cycle higher than the second duty cycle when receiving the third feedback determination signal.

4. The motor drive system of claim 3, wherein the first feedback voltage level is between 0.2 volts and 0.35 volts, the second feedback voltage level is between 0.7 volts and 1.0 volts, the third feedback voltage level is between 1.2 volts and 1.5 volts, the first duty cycle is between 35% and 40%, the second duty cycle is between 50% and 60%, and the third duty cycle is between 65% and 75%.

5. The motor drive system of claim 4, wherein the DC voltage generated by said rectifier circuit is between 100 volts and 120 volts.

6. The motor drive system of claim 3, wherein the first feedback voltage level is between 1.4 volts and 1.6 volts, the second feedback voltage level is between 1.7 volts and 1.85 volts, the third feedback voltage level is between 1.9 volts and 2.1 volts, the first duty cycle is between 35% and 40%, the second duty cycle is between 50% and 60%, and the third duty cycle is between 65% and 75%.

7. The motor drive system of claim 6, wherein the DC voltage generated by said rectifier circuit is between 220 volts and 240 volts.

8. The motor drive system of claim 1, wherein the modulated DC driving signal is a pulse-width-modulated (PWM) signal that is defined by a first output voltage at said positive output terminal of said driving module and a second output voltage at said negative output terminal of said driving module.

9. A motor drive method that is to be performed by a modulator circuit which is electrically connected to a rectifier circuit to receive a DC voltage, and which is electrically connected to a direct current (DC) motor via a positive output terminal and a negative output terminal, the modulator circuit including a pulse generation module, a feedback determination module, a pulse modulation module and a driving module including a switch, the motor drive method comprising steps of:

A) by the driving module, generating a feedback signal based on a source current of the switch, and outputting the feedback signal to the feedback determination module;

B) by the feedback determination module, generating a feedback determination signal based on the feedback signal received from the driving module, and outputting the feedback determination signal to the pulse modulation module;

C) by the pulse modulation module, receiving an original pulse signal from the pulse generation module, generating a modulated pulse signal having a modulated duty cycle based on the original pulse signal and based on the feedback determination signal received from the feedback determination module, and outputting the modulated pulse signal to the driving module; and D) by the driving module, modulating the DC voltage based on the modulated pulse signal to generate a modulated DC driving signal an average voltage of which has a positive correlation with the modulated duty cycle, and outputting the modulated DC driving signal via the positive output terminal and the negative output terminal to the DC motor, in order to drive the DC motor to operate at a rotational speed corresponding to the modulated DC driving signal.

10. The motor drive method of claim 9, the modulator circuit further electrically connected to a controller, the motor drive method further comprising a step of:

E) by the pulse generation module, receiving a control signal from the controller, generating the original pulse signal based on the control signal, and outputting the original pulse signal to the pulse modulation module.

11. The motor drive method of claim 9, the switch including a first terminal and a second terminal, wherein the modulating of the DC voltage of step D) includes controlling the switch to transition between an ON state where the first terminal is electrically connected to the second terminal and an OFF state where the first terminal is electrically disconnected from the second terminal based on the modulated pulse signal, so that a pulsed voltage that has a duty cycle with opposite phase to the modulated duty cycle of the modulated pulse signal is formed at the first terminal.

12. The motor drive method of claim 9, wherein:
step B) is to generate the feedback determination signal by selecting one of a first feedback determination signal, a second feedback determination signal and a third feedback determination signal to serve as the feedback determination signal by comparing an average voltage of the feedback signal with a first feedback voltage level, a second feedback voltage level higher than the first feedback voltage level and a third feedback voltage level higher than the second feedback voltage level, wherein the first feedback determination signal is selected when the average voltage of the feedback signal is lower than the second feedback voltage level and is not lower than the first feedback voltage level, the second feedback determination signal is selected when the average voltage of the feedback signal is lower than the third feedback voltage level and is not lower than the second feedback voltage level, and the third feedback determination signal is selected when the average voltage of the feedback signal is not lower than the third feedback voltage level; and
step C) is to generate the modulated pulse signal that has the modulated duty cycle equal to a first duty cycle when receiving the first feedback determination signal from said feedback determination module, to generate the modulated pulse signal that has the modulated duty cycle equal to a second duty cycle higher than the first duty cycle when receiving the second feedback determination signal, and to generate the modulated pulse signal that has the modulated duty cycle equal to a third duty cycle higher than the second duty cycle when receiving the third feedback determination signal.

13. The motor drive method of claim 12, wherein:
step B) is to generate the feedback determination signal by comparing the average voltage of the feedback signal with the first feedback voltage level that is between 0.2 volts and 0.35 volts, the second feedback voltage level that is between 0.7 volts and 1.0 volts, and the third feedback voltage level that is between 1.2 volts and 1.5 volts; and step C) is to generate the modulated pulse signal that has the modulated duty cycle which is between 35% and 40% when receiving the first feedback determination signal from said feedback determination module, to generate the modulated pulse signal that has the modulated duty cycle which is between 50% and 60% when receiving the second feedback determination signal, and to generate the modulated pulse signal that has the modulated duty cycle which is between 65% and 75% when receiving the third feedback determination signal.

14. The motor drive method of claim 13, wherein step D) is to modulate the DC voltage that is between 100 volts and 120 volts.

15. The motor drive method of claim 12, wherein:
step B) is to generate the feedback determination signal by comparing the average voltage of the feedback signal with the first feedback voltage level that is between 1.4 volts and 1.6 volts, the second feedback voltage level that is between 1.7 volts and 1.85 volt, and the third feedback voltage level that is between 1.9 volts and 2.1 volts; and
step C) is to generate the modulated pulse signal that has the modulated duty cycle which is between 35% and 40% when receiving the first feedback determination signal from said feedback determination module, to generate the modulated pulse signal that has the modulated duty cycle which is between 50% and 60% when receiving the second feedback determination signal, and to generate the modulated pulse signal that has the modulated duty cycle which is between 65% and 75% when receiving the third feedback determination signal.

16. The motor drive method of claim 13, wherein step D) is to modulate the DC voltage that is between 220 volts and 240 volts.

17. The motor drive method of claim 9, wherein:
step D) is to generate the modulated DC driving signal that is a pulse-width-modulated (PWM) signal which is defined by a first output voltage to be outputted from the positive output terminal and a second output voltage to be outputted from the negative output terminal, wherein the second output voltage is generated based on a drain current of the switch.

\* \* \* \* \*